United States Patent
Iwamoto et al.

(10) Patent No.: US 8,147,952 B2
(45) Date of Patent: *Apr. 3, 2012

(54) COATING MATERIAL FOR HONEYCOMB STRUCTURE

(75) Inventors: Masaki Iwamoto, Kasugai (JP); Atsushi Watanabe, Nagoya (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/688,030

(22) Filed: Jan. 15, 2010

(65) Prior Publication Data
US 2010/0112280 A1  May 6, 2010

Related U.S. Application Data

(63) Continuation of application No. PCT/JP2008/063360, filed on Jul. 25, 2008.

(30) Foreign Application Priority Data

Jul. 26, 2007 (JP) .................. 2007-195008

(51) Int. Cl.
*B32B 5/16* (2006.01)
(52) U.S. Cl. ........ 428/323; 428/116; 428/332; 428/338; 428/688; 428/689; 428/698; 428/702; 106/400

(58) Field of Classification Search .................. None
See application file for complete search history.

(56) References Cited

U.S. PATENT DOCUMENTS

| | | | |
|---|---|---|---|
| 5,629,067 A | 5/1997 | Kotani et al. | |
| 2003/0027919 A1* | 2/2003 | Fritz | 524/494 |
| 2005/0050845 A1 | 3/2005 | Masukawa et al. | |
| 2006/0101747 A1* | 5/2006 | Masukawa et al. | 52/302.1 |
| 2006/0240212 A1* | 10/2006 | Masukawa et al. | 428/58 |
| 2006/0288650 A1* | 12/2006 | Tanaka et al. | 51/309 |

FOREIGN PATENT DOCUMENTS

| | | |
|---|---|---|
| JP | 05-269388 A1 | 10/1993 |
| JP | 2000-102709 A1 | 4/2000 |
| JP | 2002-105432 A1 | 4/2002 |
| JP | 2004-130176 A1 | 4/2004 |

* cited by examiner

*Primary Examiner* — Ling Xu
(74) *Attorney, Agent, or Firm* — Burr & Brown

(57) ABSTRACT

There is provided a coating material for a honeycomb structure, the coating material including inorganic particles or organic particles having D90/D10 of 5 to 50 with D10 of 50 μm or less and D90 of 4 μm or more (wherein D10 and D90 are values of 10% diameter and 90% diameter, respectively, in volume-based integrated fraction of a particle diameter distribution measured by a laser diffraction/scattering method from the smaller particle diameter side).

5 Claims, 1 Drawing Sheet

COATING MATERIAL FOR HONEYCOMB STRUCTURE

BACKGROUND OF THE INVENTION

The present invention relates to a coating material and a honeycomb structure. More specifically, the present invention relates to a coating material capable of improving thermal resistance and chemical durability as well as inhibiting generation of a defect such as a crack by being applied on, for example, a honeycomb structure used for a trapping filter or the like for particulate matter in exhaust gas from an internal combustion engine, a boiler, or the like and dried at high temperature, and a honeycomb structure having an outer wall formed by such a coating material.

There is used a honeycomb structure for a trapping filter or the like for particulate matter, in particular, diesel particulate matter in exhaust gas from an internal combustion engine, a boiler, or the like.

As shown in FIGS. 1A and 1B, a honeycomb structure used for such a purpose generally has a plurality of cells 23 functioning as fluid passages partitioned by the partition walls 24 and has a structure where each of adjacent cells 23 is plugged in one end portion on mutually opposite side in such a manner that the end faces each shows a checkerwise pattern. In the honeycomb structure 21 having such a structure, the fluid to be treated flows into the cells 23 which are not plugged in the inflow hole side end face 25, that is, the cells 23 which are plugged in the outflow hole side end face 26, passes through the partition walls 24, and are discharged from the adjacent cells 23, that is, the cells 23 which are plugged in the inflow hole side end face 25 and not plugged in the outflow hole side end face 26. At this time, the partition walls 24 function as a filter, and, for example, soot or the like discharged from a diesel engine is trapped by the partition walls 24 and deposits on the partition walls 24. The honeycomb structure 21 used in such a manner has an uneven temperature distribution inside the honeycomb structure 21 due to a rapid temperature change or local heat generation to have a problem of crack generation or the like. In particular, in the case that the structure is used as a filter for trapping particulate matter in exhaust gas from a diesel engine (hereinbelow, referred to as a DPF), it is necessary to combust and remove the depositing carbon particulate matter for regeneration, and, at this time, local temperature rise is caused, thereby easily causing problems of deterioration in regeneration efficiency due to uneven regeneration temperature and crack generation due to large thermal stress.

Though damages inside the honeycomb structure due to thermal stress can be inhibited to some extent by segmentalizing and/or by using a material having high thermal resistance such as a silicon carbide based material, the temperature difference between the outer peripheral face portion and the central portion of the honeycomb structure cannot be solved to have a problem of causing a crack in the outer wall of the honeycomb structure.

The Patent Document 1 discloses a ceramic structure having elasticity in the outer wall by allowing the coating material for strengthen the outer peripheral face of the ceramic structure to contain inorganic fibers having a length of 100 μm to 100 mm at 10 to 70 mass % on a solid content basis. However, though damages of the honeycomb structure due to thermal stress can be inhibited by allowing the coating material to contain inorganic fibers, in the case of using long fibers having a length of 100 μm to 100 mm, an organic solvent or a large amount of water is required in order to obtain applicable paste. Since a coating material thus using a large amount of solvent shrinks to a large extent by rapid drying, thereby sometimes causing a crack, the applied coating material cannot be dried at high temperature. Therefore, in Patent Document 1, a ceramic structure where such a coating material is applied is dried at 120° C. However, since a colloidal oxide contained in the coating material is in a state of performing reversible adsorption and desorption of water at 120° C. to have insufficient drying temperature, it has a problem in the points of chemical durability such as water resistance and acid resistance in the outer wall of the resultant ceramic structure.

In the aforementioned Patent Document 1, though the coating material is filled in a depressed portion of the substrate after machining the outer periphery, the inorganic fibers and inorganic particles in the coating material move even right after the application together with the water absorption by the substrate, which may cause a problem of exposure of the substrate in a streak or a small hole-shaped state (hereinbelow expressed as a "sink"). There arise a problem of leakage of soot from the substrate-exposed portion and a problem of causing substrate fracture or the like in the substrate portion due to mechanical or thermal stress. Though the sink can be inhibited by making the inorganic particles coarse, flowability is remarkably deteriorated, thereby causing a problem of making the coating uniformly with no unapplied portion very difficult. On the other hand, though the coating material can be filled into the sink portion by applying the coating material twice, there arise problems of increasing the operation steps and generating a crack by the increase of the thickness.

Patent Document 1: JP-A-2000-102709

SUMMARY OF THE INVENTION

The present invention has been made in view of such problems of the prior art and aims to provide a coating material capable of inhibiting sink generation and being coated on the outer face uniformly with no unapplied portion in the manufacture of a honeycomb structure and a honeycomb structure coated with the coating material.

In order to achieve the above aim, according to the present invention, there are provided the following coating material for a honeycomb structure and honeycomb structure.

According to a first aspect of the present invention, a coating material for a honeycomb structure is provided, comprising inorganic particles having D90/D10 of 5 to 50 with D10 of 50 μm or less and D90 of 4 μm or more, wherein the D10 and D90 are values of 10% diameter and 90% diameter, respectively, in a volume-based integrated fraction of a particle diameter distribution measured by a laser diffraction/scattering method from the smaller particle diameter side.

According to a second aspect of the present invention, the coating material for a honeycomb structure according to the first aspect is provided, wherein the particles each has a long axis/short axis ratio of 1.0 to 4.0.

According to a third aspect of the present invention, the coating material for a honeycomb structure according to the first or second aspects is provided, wherein the coating material contains at least one kind of inorganic particles selected from the group consisting of silicon carbide, silicon nitride, boron nitride, silica, alumina, mullite, alumina silicate, magnesium silicate, zirconia, zirconium phosphate, alumina titanate, and titania.

According to fourth aspect of the present invention, the coating material for a honeycomb structure according to any one of the first to third aspects is provided, wherein the coating material further contains oxide fibers having an average length of 20 to 200 μm and an average diameter of 1 to 20 μm.

According to a fifth aspect of the present invention, the coating material for a honeycomb structure according to any one of the first to fourth aspects is provided, wherein the coating material further contains a colloidal oxide, an inorganic binder, and clay.

According to a sixth aspect of the present invention, the coating material for a honeycomb structure according to any one of the first to fourth aspects is provided, wherein the coating material further contains an organic binder and a hollow filler.

According to a seventh aspect of the present invention, a honeycomb structure coated with a coating material according to any one of the first to sixth aspects is provided.

According to the present invention, the flowability of the slurry and the inhibition of sinks can be secured. Further, by making the particle size distribution of the inorganic particles or the organic particles broad or to have two or more peaks, the fine particles act like a roller to the coarse particles to secure flowability of the slurry. In addition, when the water in the slurry is absorbed by the substrate, the coarse particles hardly move so as to obtain an effect in inhibiting sink generation. By making the particle size distribution of the inorganic particles or the organic particles broad or to have two or more peaks, a good balance between securing of the flowability of slurry and the inhibition of sinks can be achieved.

DESCRIPTION OF REFERENCE NUMERALS

Figure 1A:
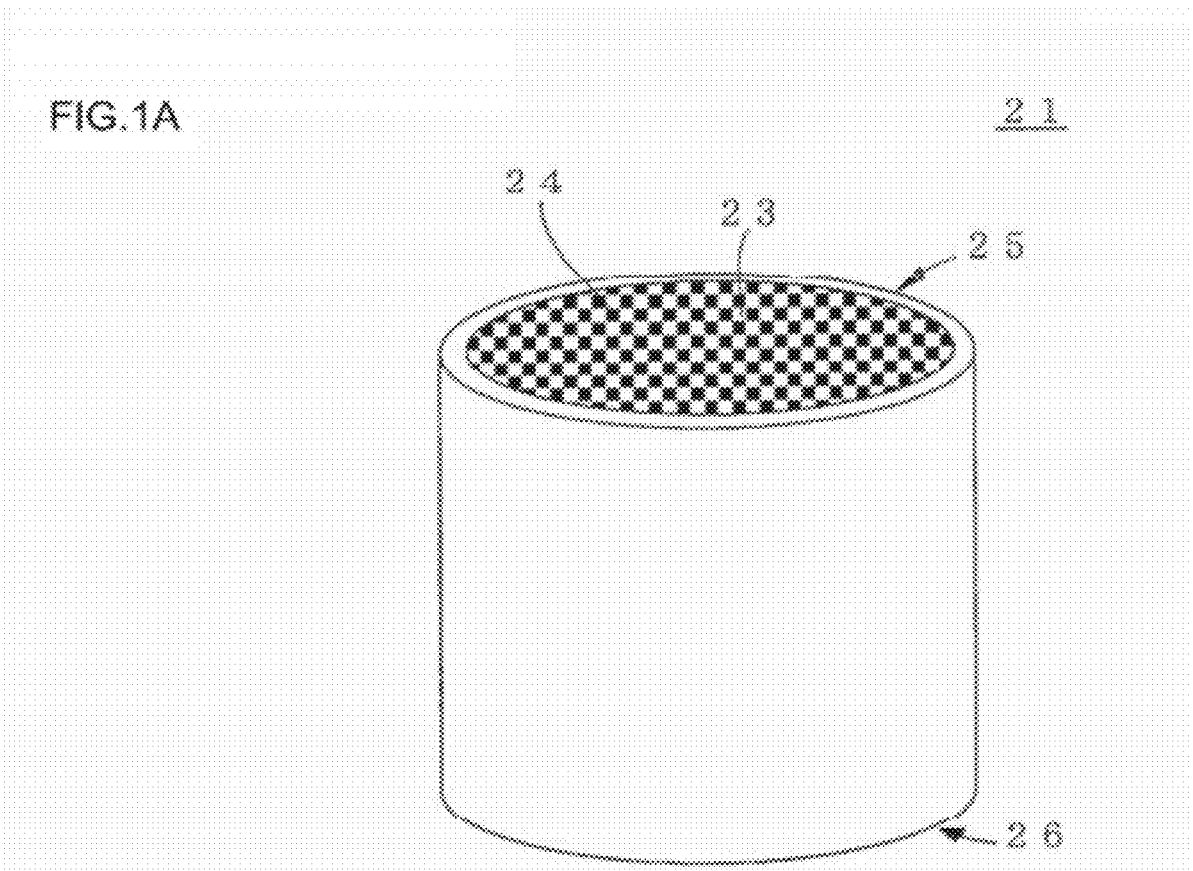
FIG. 1A is an explanatory view showing a honeycomb structure and perspective view of the honeycomb structure.
Figure 1B:
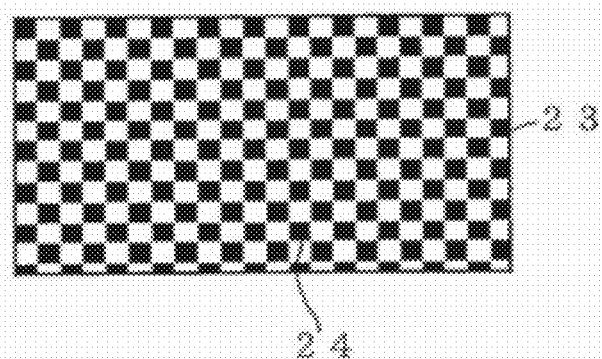
FIG. 1B is an explanatory view showing a honeycomb structure and partially enlarged plan view of an end face of the honeycomb structure.

21: honeycomb structure; 23: cell; 24: partition wall; 25: inflow hole side end face; and 26: outflow hole side end face.

DETAILED DESCRIPTION OF THE INVENTION

Hereinbelow, embodiments of the present invention will be described. However, the present invention is by no means limited to the following embodiments, and it should be understood that changes, improvements, and the like of the design may appropriately be added on the basis of ordinary knowledge of those skilled in the art within the range of not deviating from the gist of the present invention.

Generally, inorganic particles and the like are a particle group consisting of a large number of particles, and a plurality of particles having different sizes are mixed in the particle group. The particle diameter distribution measurement by a laser diffraction/scattering method is one of many particle distribution measurement methods. Since the intensity distribution pattern of the light emitted by the particles to be measured becomes the overlap of diffraction/scattering light from each particle, by detecting and analyzing the light intensity distribution pattern, the sizes and the rates of the particles (particle size distribution) can be obtained.

Generally, the particle diameter of inorganic particles and the like means the average particle diameter of present particles and the like and is considered to be distributed within a fixed range with the average particle diameter as the center. When the particle distributions are obtained, there are sharp particle distributions and broad particle distributions even in the distributions having only one peak. Here, a broad particle distribution is considered to have a particle distribution of a wide range particle size without having a sharp peak. In particles having a broad particle distribution, not only large particles but also middle-sized particles and small particles are present relatively.

Further, when the particle distributions of the inorganic particles and the like are investigated, a particle distribution having two or more peaks is also present. In the case of manufacturing such inorganic particles and the like, they can easily be obtained by focusing on cutting particles corresponding with the particle sizes in a certain range or mixing a particle group having a different average particle diameter.

In the present invention, a particle distribution is obtained by obtaining the values of D10 and D90 of 10% diameter and 90% diameter, respectively, in a volume-based integrated fraction of a particle diameter distribution measured by a laser diffraction/scattering method. Here, D10 and D90 mean values of 10% diameter and 90% diameter, respectively, in a volume-based integrated fraction of a particle diameter distribution measured by a laser diffraction/scattering method by cumulating from the smaller particle diameter side. The present invention employs inorganic particles having a broad particle distribution. In the present invention, the broadening of the particle distribution is achieved by the broadening with one peak with the broad particle distribution and/or the broadening of the particle distribution with two or more peaks. By imparting a broad particle distribution to the particles, the fine particles (particles having relatively small particle diameters) act like a roller to the coarse particles (particles having relatively large particle diameters), thereby securing flowability of the slurry.

In the present invention, the broadening of the particle distribution is evaluated by obtaining D90/D10 of the inorganic particles in the coating material.

The D90/D10 is preferably 10 to 500, particularly preferably 10 to 430. The D10 is preferably 100 μm or less, more preferably 50 μm or less, and particularly preferably 2 μm or less. The D90 is preferably 4 μm or more, more preferably, 6 μm or more. When D90/D10 is 10 to 500, D10 is 100 μm or less, and D90 is 4 μm or more in the particle distribution; the effect of the present invention is exhibited. When D90/D10 is 10 to 430, D10 is 2 μm or less, and D90 is 6 μm or more in the particle distribution; the effect of the present invention is remarkably exhibited.

By broadening the particle distribution of inorganic particles or making the distribution have two or more peaks, the fine particles act like a roller to the coarse particles to secure flowability of the slurry. In addition, when water in the slurry is absorbed by the substrate, the coarse particles hardly move to obtain an effect in inhibiting sink generation. By broadening the particle distribution of inorganic particles or making the distribution have two or more peaks, both the securing of flowability of the slurry and the inhibition of a sink become possible.

In addition, it is general that the inorganic particles have various shapes such as an oval spherical shape, a flat plate shape, a circular columnar shape, and a stick shape without a completely spherical shape, and, when the particle diameter is mentioned, a long particle diameter and a short particle diameter are present. As a result of measuring the ratio of the long particle diameter to the short particle diameter as a long axis/short axis ratio (long axis/short axis), in the present invention, the ratio is preferably 1.0 to 4.0, particularly preferably 1.3 to 3.4. These values can be obtained by imageprocessing the image of the inorganic particles obtained by an optical microscope or a scanning electron microscope.

The coating material contains preferably at least one kind of inorganic particles which satisfy the above conditions of D90/D10, D90 and D10, and is selected from the group consisting of silicon carbide, silicon nitride, aluminum nitride, boron nitride, silica, alumina, mullite, zirconia, zirconium phosphate, alumina titanate, titania, mica, and cordierite; and particularly preferably at least one kind of inorganic particles selected from the group consisting of silicon carbide, silicon nitride, alumina, and cordierite.

The coating material preferably contains inorganic fibers. Examples of the inorganic fibers include oxide fibers of alumina silicate, alumina, or the like; and other fibers (e.g., SiC fibers). In the present invention, oxide fibers are the most suitable one. Specific suitable examples include ceramic fibers of silica, mullite, alumina, silicon carbide, silica-alumina, magnesia-silica, magnesia-calcia-silica or the like. The inorganic fibers having an average length of 10 to 600 μm and an average diameter of 1 to 20 μm are preferable, and the inorganic fibers having an average length of 50 to 500 μm and an average diameter of 1 to 20 μm are particularly preferable. Though coarse particles called as shots are inevitably generated upon manufacturing ceramic fibers, even if the shots are contained, by classifying and removing the shots, fibers having a desired average length and a desired average diameter can be obtained. When the average value of the length (average length) in the axial direction of the inorganic fibers used in the coating material is below 10 μm, since shrinkage is increased upon drying the coating material, a sink or a crack is easily caused upon application. On the other hand, when the average value of the length (average length) in the axial direction of the inorganic fibers is above 600 μm, it is difficult to obtain paste having a viscosity enabling to apply the coating material in a good state. When the average value of the length in the diametrical direction (average diameter) of the inorganic fibers is above 20 μm, a thin spot or the like may be caused upon applying the coating material to make uniform application difficult. On the other hand, when the average value of the length in a diametrical direction (average diameter) of the inorganic fibers is below 1 μm, a sink or a crack is easily caused upon application.

It is preferable that the coating material of the present invention further contains a colloidal oxide and an inorganic binder. Examples of the colloidal oxide include silica sol, alumina sol, colloidal silica, colloidal alumina or the like. These may be used alone or in combination of two or more kinds. Examples of the inorganic binder include silica sol, alumina sol, clay or the like.

The colloidal oxide is suitable for imparting adhesivity, and by appropriately selecting the aforementioned inorganic particles in accordance with the material for the surface where the coating material is applied, affinity of the coating material can be improved. The aforementioned colloidal oxide bonds to inorganic fibers and inorganic particles by drying and dehydration to obtain a strong dried coating material having excellent thermal resistance and the like. In particular, since the colloidal oxide bonds irreversibly by drying at 150° C. or more, the dried coating material can be made excellent also in chemical durability.

It is preferable that the coating material of the present invention further contains an organic binder and a hollow filler. An organic binder generally means a bonding agent which is organic matter. A bonding agent is a material used for forming a material or a product by bonding or fixing the same kind or different kinds of solids. In the case of manufacturing ceramic, an organic binder generally means various organic compounds enabling to form a ceramic raw material powder and being added in order to impart strength required for maintaining the shape. Therefore, typical examples of the organic binder include naturally-derived starch, gelatin, agar, semisynthetic alkyl cellulose (e.g., methyl cellulose), a cellulose derivative such as carboxymethyl cellulose, synthetic water-soluble polymer such as polyvinyl alcohol, polymer of polyacrylate type, polyacrylamide, polyethylene oxide or the like. Examples of the organic binder of the present invention include polyvinyl alcohol (PVA), carboxymethyl cellulose (CMC), methyl cellulose (MC) or the like. Examples of the typical hollow filler include poly(methyl methacrylate), polyethylene, polyethylene telephthalate, a resin balloon, a fly ash balloon, a shirasu balloon, silica sol or the like.

In the present invention, mixing and kneading of the material can be performed by a conventionally known mixer or kneader, for example, a sigma kneader, a bunbury mixer, a screw type extrusion kneader or the like. In particular, a kneader provided with a vacuum pressure-reducing apparatus (e.g., vacuum pump or the like) for removing air contained in the clay (so-called a vacuum kneader) is preferable in that kneaded clay having good formability with few defects can be obtained.

EXAMPLES

Hereinbelow, the present invention will be described in more detail using Examples. However, the present invention is by no means limited to these Examples.

Examples 1 to 13, Comparative Examples 1 to 4

As raw materials, a SiC powder and a Si powder were mixed at a mass ratio of 80:20. To the mixture were added starch and a resin balloon as pore formers and further added methyl cellulose, hydroxypropoxylmethyl cellulose, a surfactant, and water to prepare kneaded clay having plasticity. The kneaded clay was subjected to extrusion forming and drying with microwaves and hot air to obtain a honeycomb segment having a partition wall thickness of 310 μm, a cell density of about 46.5 cells/cm$^2$ (300 cells/sq.in.), a cross section having a square shape having a side of 35 mm, and a length of 152 mm. The honeycomb segment was subjected to plugging with the same material as the material used for manufacturing the honeycomb segment in such a manner that each of the aforementioned adjacent flow-through holes is plugged in one end portion on mutually opposite side to have each of the end faces showing a checkerwise pattern, dried, degreased at about 400° C. in an ambient atmosphere, and then fired at about 1450° C. in Ar inert atmosphere to obtain a Si-bonded SiC fired honeycomb segment.

To 40 mass % of a silicon carbide powder as the inorganic particles were added 30 mass % of alumina silicate fibers as the oxide fibers, 0.5 mass % of carboxymethyl cellulose as the organic binder, 20 mass % of colloidal silica as the inorganic binder, and 9.5 mass % of water, followed by kneading for 30 minutes to obtain bonding material slurry. Using the bonding material slurry, 16 fired honeycomb segments obtained above were bonded together and dried to obtain a bonded article, and the outer periphery thereof was ground.

Next, to 40 mass % of a silicon carbide powder, silicon nitride powder, alumina powder, or cordierite powder having various D90/D10 ratios as the inorganic particles were added 30 mass % or alumina silicate fibers as the organic fibers, 25 mass % of colloidal silica as the inorganic binder, 0.1 mass % of carboxymethyl cellulose as the organic binder, 0.9 mass % of clay, and 4 mass % of water, followed by kneading for 30 minutes to obtain coating material slurry shown in Table 1. Among the bonding materials A to Q in Table, A to H and L to Q were used for Examples of the present invention, and I to K and M were used for Comparative Examples.

TABLE 1

| Coating material No. | Kind of inorganic particle | Inorganic particle size | | | | Length of fiber μm | Average diameter of fiber μm |
|---|---|---|---|---|---|---|---|
| | | D10 μm | D90 μm | D90/D10 | Long axis/short axis | | |
| A | Silicon carbide | 0.8 | 6.4 | 8.0 | 1.6 | 50 | 5.0 |
| B | Silicon carbide | 1.4 | 65 | 46.4 | 1.5 | 50 | 5.0 |
| C | Silicon carbide | 39 | 221 | 5.7 | 1.8 | 50 | 5.0 |
| D | Silicon carbide | 1.1 | 7.6 | 6.9 | 3.4 | 50 | 5.0 |
| E | Silicon nitride | 0.8 | 5.6 | 7.0 | 1.3 | 50 | 5.0 |
| F | Alumina | 0.9 | 7.1 | 7.9 | 1.7 | 50 | 5.0 |
| G | Cordierite | 0.7 | 6.7 | 9.6 | 1.4 | 50 | 5.0 |
| H | Silicon carbide | 0.8 | 6.4 | 8.0 | 1.6 | 150 | 10.0 |
| I | Silicon carbide | 0.5 | 2.1 | 4.20 | 1.4 | 50 | 5.0 |
| J | Silicon carbide | 1.3 | 79 | 61 | 1.8 | 50 | 5.0 |
| K | Silicon carbide | 0.6 | 3.5 | 5.83 | 1.7 | 50 | 5.0 |
| L | Silicon carbide | 69 | 805 | 11.67 | 1.4 | 50 | 5.0 |
| M | Silicon carbide | 1.5 | 10.9 | 7.27 | 4.2 | 50 | 5.0 |
| N | Silicon carbide | 0.8 | 6.4 | 8.0 | 1.5 | 15 | 5.0 |
| O | Silicon carbide | 0.8 | 6.4 | 8.0 | 1.5 | 300 | 5.0 |
| P | Silicon carbide | 0.8 | 6.4 | 8.0 | 1.5 | 150 | 30.0 |
| Q | Silicon carbide | 0.8 | 6.4 | 8.0 | 1.5 | 10 | 0.5 |

Each coating material slurry was applied on the outer peripheral face of the bonded article subjected to grinding of the outer periphery thereof and dried at 200° C. for 2 hours to obtain a honeycomb structure.

D10 and D90 of silicon carbide, silicon nitride, alumina and cordierite was measured by a laser diffraction/scattering method according to JIS R1629. Regarding the unapplied portion, evaluation was given depending on the presence/absence of exposure of the substrate right after the coating material was applied. Regarding the sink, evaluation was given depending on the presence/absence of exposure of the substrate after being left at room temperature for 5 minutes after the application of the coating material.

TABLE 2

| | Coating Material No. | Unapplied portion | Sink (exposure of segment after application) |
|---|---|---|---|
| Example 1 | A | Absent | Absent |
| Example 2 | B | Absent | Absent |
| Example 3 | C | Absent | Absent |
| Comp. Ex. 1 | I | Absent | Present |
| Comp. Ex. 2 | J | Present | Absent |
| Comp. Ex. 3 | M | Absent | Present |
| Comp. Ex. 4 | K | Present | Absent |

As shown in Table 2, in Examples 1, 2, and 3, since the values of D90/D10 of the inorganic particles were between 5 to 50 with D10 of 50 μm or less and D90 of 4 μm or more, neither an unapplied portion nor a sink was caused. On the other hand, in Comparative Examples 1 and 3, since the values of D90/D10 of the inorganic particles were 4.20 and 5.83, respectively, which are values not higher than 10, with D90 of 2.1 μm and 3.5 μm, respectively, which are not higher than 4 μm, a sink was caused though no unapplied portion of the coating material was caused. In Comparative Example 2, since D90/D10 of the inorganic particles was 61, which was not lower than 51, an unapplied portion of the coating material was caused though no sink was caused. In Comparative Example 4, though D90/D10 of the inorganic particles was 11.67, which is between 5 and 50, since D10 was 69 μm, which is not 50 μm or lower, an unapplied portion of the coating material was caused though no sink was caused.

From the results of Table 2, there was confirmed that an excellent effect of the honeycomb structure-coating material where D90/D10 of inorganic particles or organic particles is 5 to 50 with D10 of 50 μm or less and D90 of 4 μm or more.

TABLE 3

| | Coating Material No. | Unapplied portion | Sink (exposure of segment after application) |
|---|---|---|---|
| Example 1 | A | Absent | Absent |
| Example 4 | D | Absent | Absent |
| Example 5 | L | Present | Absent |

As shown in Table 3, in Examples 4 and 5, since the values of D90/D10 of the inorganic particles were between and 50 with D10 of 50 μm or less and D90 of 4 μm or more, and the long axis/short axis ratios of the inorganic particles were 1.6 and 3.4, respectively, no sink was caused. On the other hand, in Example 5, the long axis/short axis ratio of the inorganic particles was 4.2, and a few unapplied portions of the coating material were caused due to deterioration in flowability as a result of the evaluation. However, there was no practical problem.

From the results of Table 3, it was confirmed that, when the long axis/short axis ratio of the inorganic particles is from 1.0 to 4.0, a more excellent effect is exhibited.

TABLE 4

| | Coating Material No. | Unapplied portion | Sink (exposure of segment after application) |
|---|---|---|---|
| Example 1 | A | Absent | Absent |
| Example 6 | E | Absent | Absent |
| Example 7 | F | Absent | Absent |
| Example 8 | G | Absent | Absent |

As shown in Table 4, in Examples 1 and 6 to 8, since the values of D90/D10 were between 5 and 50 with D10 of 50 μm or less and D90 of 4 μm or more, and the long axis/short axis ratio of 1.0 to 4.0, neither an unapplied portion of the coating material nor a sink was caused even though silicon carbide was substituted by other inorganic particles such as silicon nitride, alumina, cordierite or the like.

From the results of Table 4, there was confirmed an excellent effect of a honeycomb structure-coating material of the present invention containing at least one kind of inorganic particles selected from the group consisting of silicon carbide, silicon nitride, boron nitride, silica, alumina, mullite, alumina silicate, magnesium silicate, zirconia, zirconium phosphate, alumina titanate, and titania; in particular, a material containing silicon carbide, silicon nitride, alumina, or cordierite.

TABLE 5

|  | Coating Material No. | Unapplied portion | Sink (exposure of segment after application) |
| --- | --- | --- | --- |
| Example 1 | A | Absent | Absent |
| Example 9 | H | Absent | Absent |
| Example 10 | N | Absent | Present |
| Example 11 | O | Present | Absent |

As shown in Table 5, in the cases of Example 1, where the fibers had an average length of 50 μm, and Example 9, where the fibers had an average length of 150 μm, neither an unapplied portion of the coating material nor a sink was found. In Example 10, where the fibers had an average length of 15 μm, a few sinks were caused. However, there was no practical problem. In Example 11, where the fibers had a length of 300 μm, a few unapplied portions were caused. However, there was no practical problem.

TABLE 6

|  | Coating Material No. | Unapplied portion | Sink (exposure of segment after application) |
| --- | --- | --- | --- |
| Example 1 | A | Absent | Absent |
| Example 12 | P | Present | Absent |
| Example 13 | Q | Absent | Present |

As shown in Table 6, in contrast to Example 1, where the fibers had the average diameter of 5.0 μm, in the case of Example 12, where the fibers had the average diameter of 30.0 μm, an unapplied portion of the coating material was caused. However, there was no practical problem. In addition, in Example 13, where the fibers had the average diameter of 0.5 μm, a sink was caused. However, there was no practical problem.

From the results of Tables 5 and 6, there was confirmed a more excellent effect of a honeycomb structure-coating material of the present invention containing oxide fibers having an average length of 20 to 200 μm and average diameter of 1 to 20 μm.

INDUSTRIAL APPLICABILITY

A honeycomb structure-coating material of the present invention and a honeycomb structure of the present invention are effectively used in various industrial fields requiring various filters of a diesel engine exhaust gas treatment apparatus, a dust removal apparatus, a water treatment apparatus, and the like.

The invention claimed is:

1. A coating material for a honeycomb structure, comprising inorganic particles, all of which have a D90/D10 of 5 to 50, with a D10 of 50 μm or less and a D90 of 4 μm or more;
    wherein D10 and D90 are values of 10% diameter and 90% diameter, respectively, in a volume-based integrated fraction of a particle diameter distribution measured by a laser diffraction/scattering method from the smaller particle diameter side;
    wherein the inorganic particles have a long axis/short axis ratio of 1.3 to 4.0; and
    wherein the coating material contains at least one kind of inorganic particles selected from the group consisting of silicon carbide, silicon nitride, boron nitride, alumina, mullite, alumina silicate, magnesium silicate, zirconia, zirconium phosphate, alumina titanate, and titania.

2. A coating material for a honeycomb structure according to claim 1, wherein the coating material further contains oxide fibers having an average length of 20 to 200 μm and an average diameter of 1 to 20 μm.

3. A coating material for a honeycomb structure according to claim 1, wherein the coating material further contains a colloidal oxide, an inorganic binder, and clay.

4. A coating material for a honeycomb structure according to claim 1, wherein the coating material further contains an organic binder and a hollow filler.

5. A honeycomb structure coated with a coating material according to claim 1.

* * * * *